(12) United States Patent
Noguchi et al.

(10) Patent No.: US 11,327,495 B2
(45) Date of Patent: May 10, 2022

(54) VEHICLE CONTROL SYSTEM

(71) Applicant: HONDA MOTOR CO., LTD., Tokyo (JP)

(72) Inventors: Junpei Noguchi, Wako (JP); Katsuyasu Yamane, Wako (JP); Miki Tsujino, Wako (JP); Masahiro Kowada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 180 days.

(21) Appl. No.: 16/830,945

(22) Filed: Mar. 26, 2020

(65) Prior Publication Data
US 2020/0310441 A1 Oct. 1, 2020

(30) Foreign Application Priority Data

Mar. 29, 2019 (JP) .............................. JP2019-067978

(51) Int. Cl.
*G05D 1/02* (2020.01)
*G05D 1/00* (2006.01)
*B62D 5/04* (2006.01)
*B62D 3/12* (2006.01)

(52) U.S. Cl.
CPC .......... *G05D 1/0212* (2013.01); *G05D 1/0016* (2013.01); *B62D 3/12* (2013.01); *B62D 5/04* (2013.01); *G05D 2201/0213* (2013.01)

(58) Field of Classification Search
CPC .... B62D 5/04; B62D 3/12; G05D 2201/0213; G05D 1/0016; G05D 1/0212

USPC ............................................................ 701/2
See application file for complete search history.

(56) References Cited

U.S. PATENT DOCUMENTS

| 10,040,482 | B1* | 8/2018 | Jung ..................... B62D 15/027 |
| 10,821,972 | B2* | 11/2020 | Krekel .................. B60W 50/14 |
| 11,091,155 | B2* | 8/2021 | Suzuki .................. B60W 50/14 |
| 2013/0311004 | A1* | 11/2013 | Okamura ............. G05D 1/0033 701/2 |
| 2014/0222252 | A1* | 8/2014 | Matters ................ G05D 1/0011 701/2 |
| 2018/0056989 | A1* | 3/2018 | Donald ................. G05D 1/0016 |
| 2019/0004508 | A1* | 1/2019 | Bonander ........... B62D 15/0285 |
| 2020/0086852 | A1* | 3/2020 | Krekel .................. B60W 50/14 |

(Continued)

FOREIGN PATENT DOCUMENTS

JP 2017077749 A 4/2017

*Primary Examiner* — Yazan A Soofi
(74) *Attorney, Agent, or Firm* — Armstrong Teasdale LLP (57) ABSTRACT

A vehicle control system includes: a terminal including an input/output unit and configured to be carried by a user; and a control device configured to perform wireless communication with the terminal and to execute autonomous parking processing to move a vehicle to a parking position and to park the vehicle at the parking position, wherein the control device includes a vehicle position identifying unit configured to detect a position of the vehicle, and an action plan unit configured to set a reference position where the user is deemed to hold the terminal outside the vehicle without moving and to compute a traveling route of the vehicle from an alighting position where the user alights from the vehicle to the parking position such that a condition that a distance from the reference position to the vehicle does not exceed a prescribed value is satisfied.

7 Claims, 7 Drawing Sheets

(56) References Cited

U.S. PATENT DOCUMENTS

2020/0142400 A1* 5/2020 Kuwabara ............ B62D 15/027
2021/0216067 A1* 7/2021 Noguchi ............ B62D 15/0285
2021/0303002 A1* 9/2021 Shimamoto .......... G05D 1/0223

* cited by examiner

Fig.1

*Fig.2A* rear ←—→ front

*Fig.2B* rear ←—→ front

Related Art

VEHICLE CONTROL SYSTEM

TECHNICAL FIELD

The present invention relates to a vehicle control system that can execute autonomous parking processing of a vehicle by a remote operation using a terminal carried by a user.

BACKGROUND ART

To ensure the safety of autonomous parking processing by a remote operation, a user who performs the remote operation needs to monitor a vehicle during the autonomous parking processing. For example, JP2017-77749A discloses a parking assist device that stops a vehicle when the vehicle sends a notification signal to a user during autonomous parking processing but the user does not send a response signal to the notification signal from a mobile terminal within a prescribed time. While this kind of control is executed, the user needs to continuously send the response signal (namely, to continuously monitor the vehicle) within the prescribed time to make the vehicle travel to a parking position.

Figure 7:
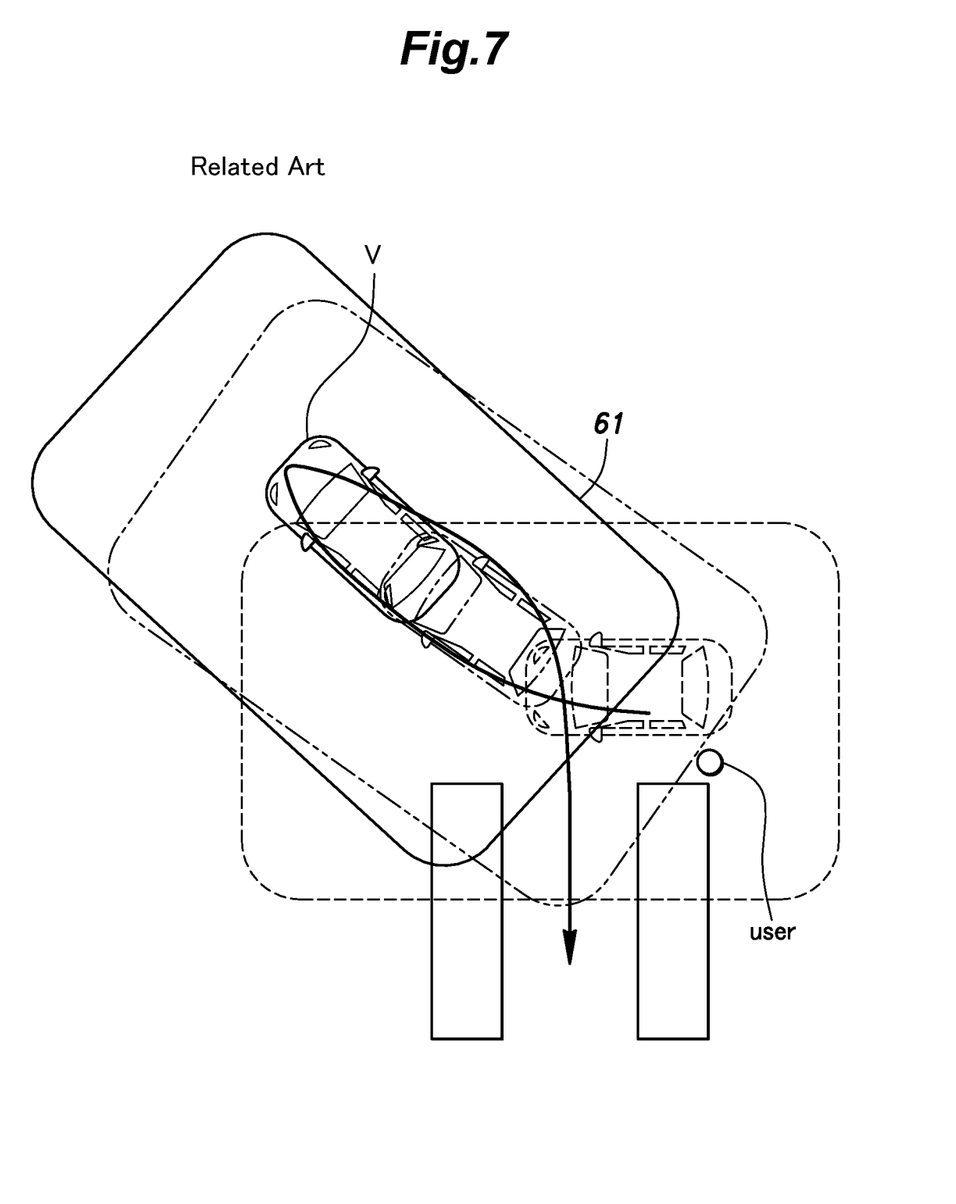
FIG. 7 is a schematic diagram showing an autonomous parking processing according to a related art.

During the autonomous parking processing, the user needs not only to monitor the vehicle but also to stay within a prescribed distance from the vehicle, and this rule may be stipulated by the law in the future. As shown in FIG. 7, in a case where the prescribed distance is about 6 m or less, the user operating the terminal near the parking position may deviate from an imaginary frame 61 indicating the prescribed distance from the vehicle. If the vehicle is stopped every time the vehicle separates from the user and then the traveling of the vehicle is resumed after the user approaches the vehicle, the autonomous parking processing may take time. On the other hand, if the user performs the autonomous parking processing while moving with the vehicle, the user needs to monitor the vehicle and its vicinity and to operate the terminal while simultaneously moving with the vehicle, so that the burden on the user becomes greater.

SUMMARY OF THE INVENTION

In view of such a problem of the prior art, a primary object of the present invention is to provide a vehicle control system that can execute autonomous parking processing such that a distance between a vehicle and a user does not exceed a prescribed value even when the user performing a remote operation of the vehicle does not move.

To achieve such an object, one embodiment of the present invention provides a vehicle control system (1) that includes: a terminal (3) including an input/output unit (30) and configured to be carried by a user; and a control device (15) configured to perform wireless communication with the terminal and to execute autonomous parking processing to move a vehicle (V) to a parking position and to park the vehicle at the parking position, wherein the control device includes a vehicle position identifying unit (42) configured to detect a position of the vehicle, and an action plan unit (43) configured to set a reference position where the user is deemed to hold the terminal outside the vehicle without moving and to compute a traveling route of the vehicle from an alighting position where the user alights from the vehicle to the parking position such that a condition that a distance from the reference position to the vehicle does not exceed a prescribed value is satisfied.

According to this arrangement, the distance from the reference position to the vehicle traveling from the alighting position to the parking position does not exceed the prescribed value. Therefore, it is possible to prevent the distance from the vehicle to the user from exceeding the prescribed value during the autonomous parking processing by a remote operation, if the user monitors the vehicle at the reference position during the autonomous parking processing.

Preferably, the action plan unit is configured to compute a recommended position suitable for the user to perform a remote operation of the vehicle by using the terminal outside the vehicle without moving, to set the reference position to the recommended position, and to compute the traveling route such that the condition is satisfied, and the input/output unit is configured to display the recommended position and the traveling route.

According to this arrangement, it is possible to notify the user of a position suitable for monitoring the vehicle during the autonomous parking processing by a remote operation.

Preferably, the action plan unit is configured to set the alighting position such that the alighting position is closer to the recommended position than the parking position and to stop the vehicle in which the user rides at the alighting position.

According to this arrangement, since the alighting position is close to the recommended position, the user can easily move from the alighting position to the recommended position. Thereby, it is possible to shorten a period from a timing when the user alights from the vehicle to a timing when the vehicle is parked at the parking position.

Preferably, the terminal includes a position detection unit (32) configured to detect a terminal position that is a position of the terminal, and when the action plan unit determines that the terminal position received from the terminal does not correspond to the recommended position after the action plan unit computes the traveling route, the action plan unit sets the reference position to the terminal position and computes the traveling route again such that the condition is satisfied.

According to this arrangement, even if the user does not move to the recommended position, it is possible to continue the autonomous parking processing by a remote operation by computing the traveling route again.

Preferably, when the action plan unit determines, at a certain timing while the vehicle is traveling, that the terminal moves from the reference position based on the terminal position, the action plan unit sets the reference position to the terminal position at the certain timing and computes the traveling route again such that the condition is satisfied.

According to this arrangement, even if the user moves while the vehicle travels in the autonomous parking processing by a remote operation, it is possible to continue the autonomous parking processing by computing the traveling route again.

Preferably, the terminal includes a position detection unit (32) configured to obtain a relative distance from the vehicle to the terminal, and when the action plan unit receives the relative distance from the terminal and estimates that the relative distance will exceed the prescribed value if the vehicle travels along the traveling route, the action plan unit estimates a current position of the user based on a change in the relative distance, sets the reference position to the estimated current position, and computes the traveling route such that the condition is satisfied.

According to this arrangement, even if a position (coordinate) of the terminal is not obtained, it is possible to confirm whether the condition about the distance between the vehicle and the user is satisfied and to compute the traveling route again by obtaining the relative distance from the vehicle to the terminal.

Preferably, the terminal includes a position detection unit (32) configured to detect a terminal position that is a position of the terminal, and the action plan unit sets the reference position to the terminal position and computes the traveling route such that the condition is satisfied.

According to this arrangement, it is possible to compute the traveling route based on an actual position of the user.

Thus, according to one embodiment of the present invention, it is possible to provide a vehicle control system that can execute autonomous parking processing such that a distance between a vehicle and a user does not exceed a prescribed value even when the user performing a remote operation of the vehicle does not move.

DESCRIPTION OF THE PREFERRED EMBODIMENT(S)

Figure 1:
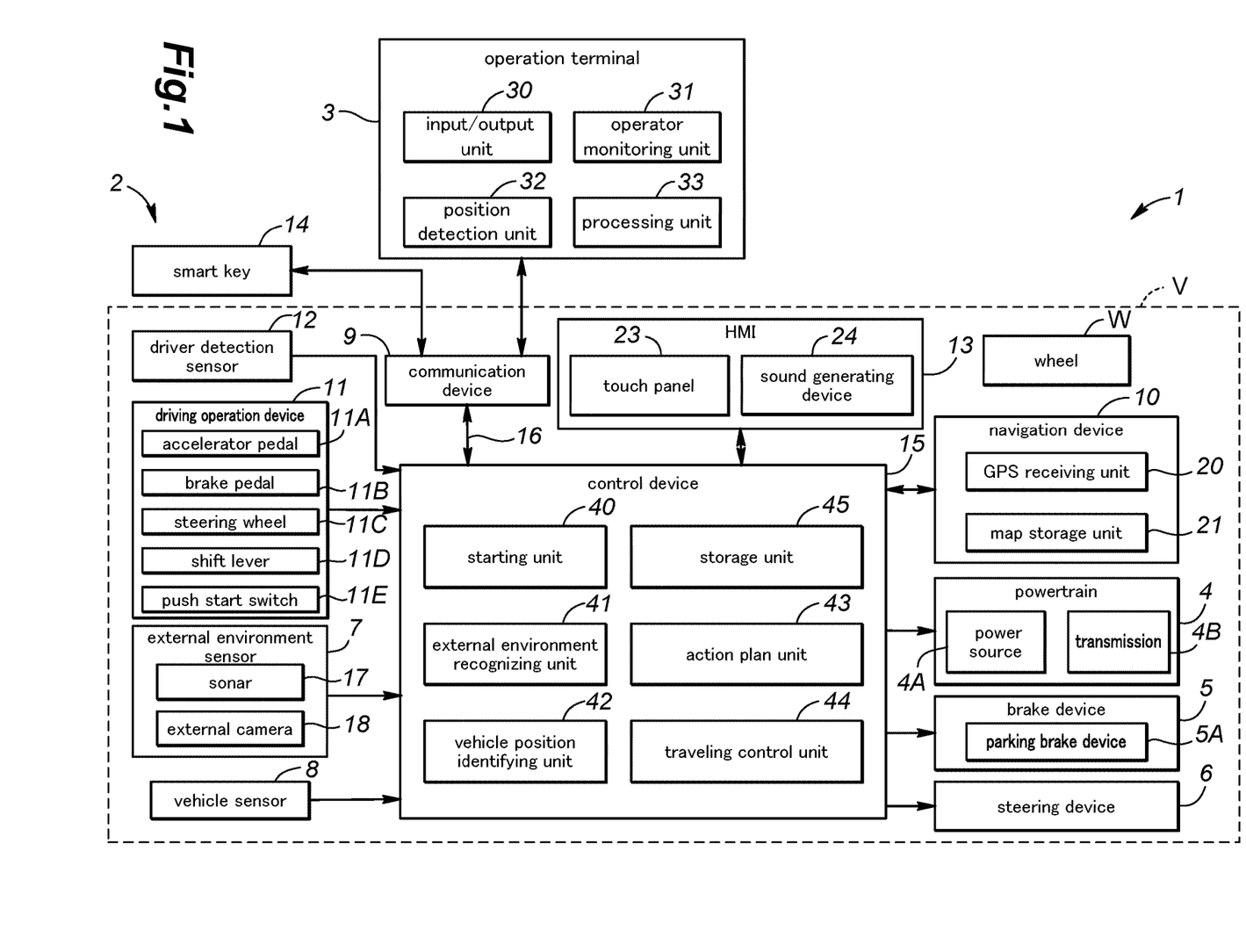
FIG. 1 is a functional block diagram of a vehicle control system according to an embodiment of the present invention.

As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Figure 2A:
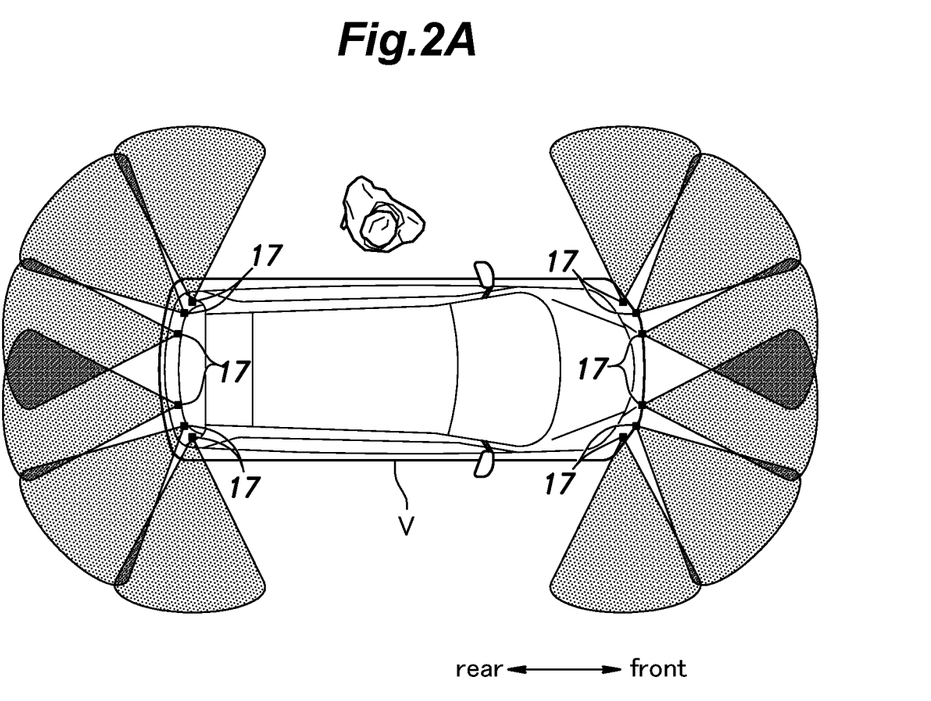
FIG. 2A is a schematic plan view showing sonars provided in a vehicle and detection areas of the sonars in the vehicle control system according to the embodiment of the present invention.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars 17 in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
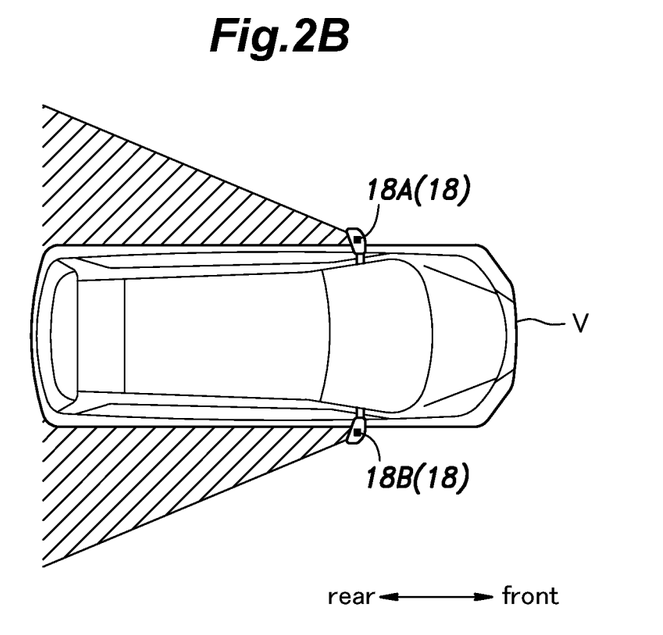
FIG. 2B is a schematic plan view showing door mirror cameras provided in the vehicle and image capturing areas of the door mirror cameras in the vehicle control system according to the embodiment of the present invention.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras 18A, 18B that are provided in the vicinity of the door mirrors of the vehicle V to capture images behind left and right sides of the vehicle V. In FIG. 2B, image capturing areas (detection areas) of the door mirror cameras 18A, 18B are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

After the vehicle V has stopped, the action plan unit 43 executes parking assist processing, when the user performs an input corresponding to desire for parking assistance (remote parking assistance) by a remote operation. In the following, the parking assist processing will be described with reference to a sequence diagram of FIG. 3.

Figure 3:
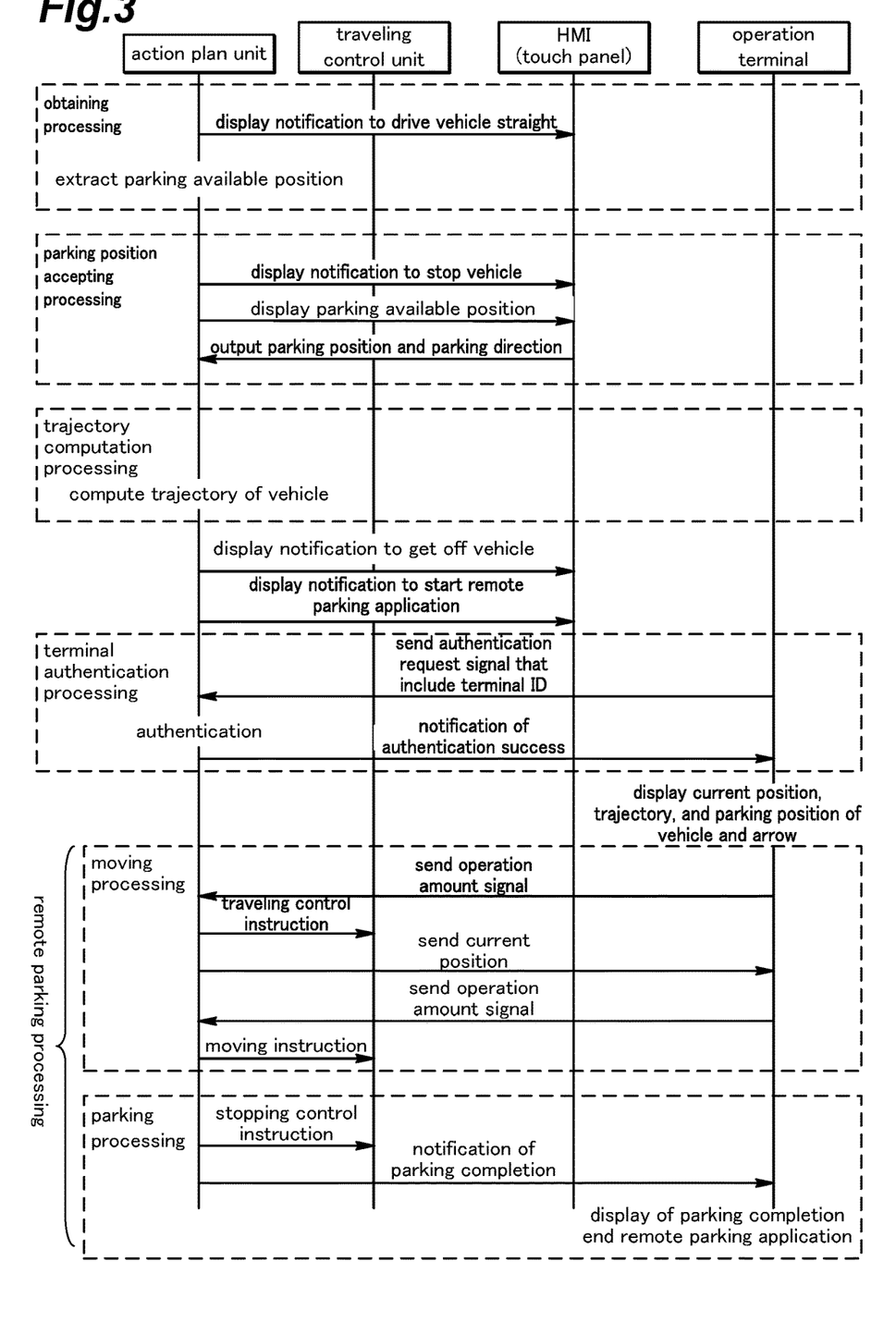
FIG. 3 is a sequence diagram of parking assist processing in the vehicle control system according to the embodiment of the present invention.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes terminal authentication processing to execute the authentication of the operation terminal 3 connected to the vehicle V. In the terminal authentication processing, the operation terminal 3 sends the action plan unit 43 an authentication request signal that includes the terminal ID of the operation terminal 3, and the action plan unit 43 executes the authentication (determination) of the operation terminal 3 based on the terminal ID of the operation terminal 3. When the action plan unit 43 succeeds in the authentication of the operation terminal 3, the action plan unit 43 sends a signal to notify authentication success to the operation terminal 3, and then the input/output unit 30 of the operation terminal 3 displays the current position, trajectory, and parking position of the vehicle V and a vertical arrow. Thereby, the user can instruct the action plan unit 43 to execute the remote parking processing by performing the input to the input/output unit 30 of the operation terminal 3. The remote parking processing includes moving processing to move the vehicle V from the current position to the parking position and parking processing to park the vehicle V at the parking position.

When the user swipes (operates) the vertical arrow displayed on the input/output unit 30 of the operation terminal 3, the operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to the operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the parking assist processing is completed.

Figure 4A:
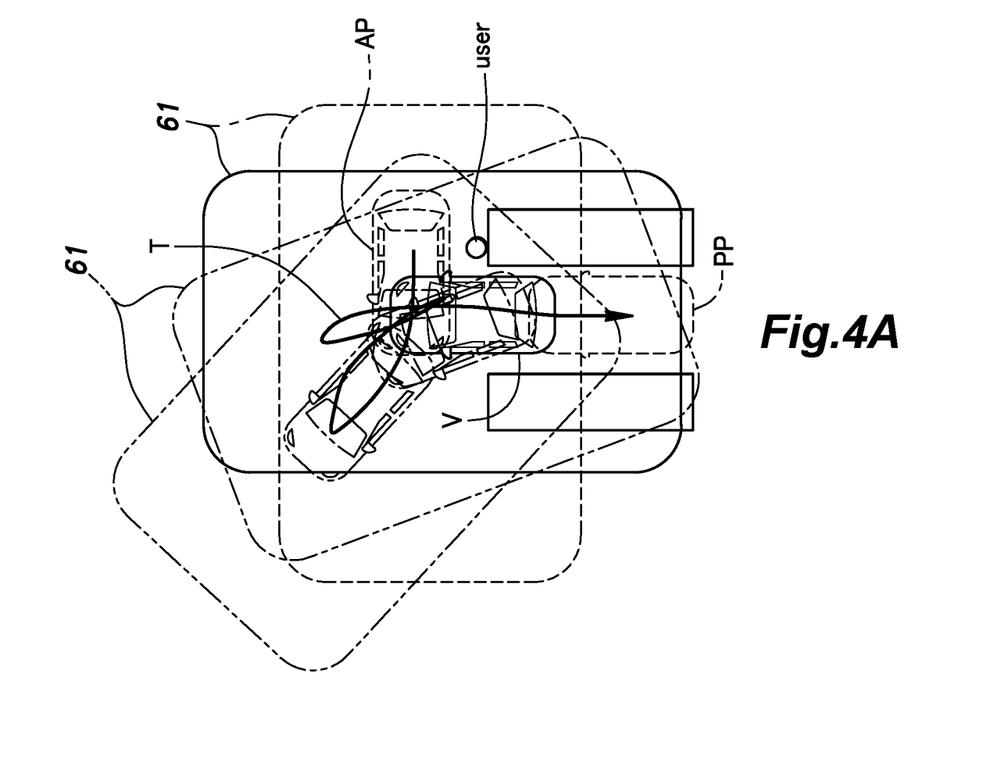
FIG. 4A is a schematic plan view showing a trajectory (traveling route) of the vehicle computed by the vehicle control system and a position of a user in a case where the user is in a side near the parking position with respect to the vehicle according to the embodiment of the present invention.
Figure 4B:
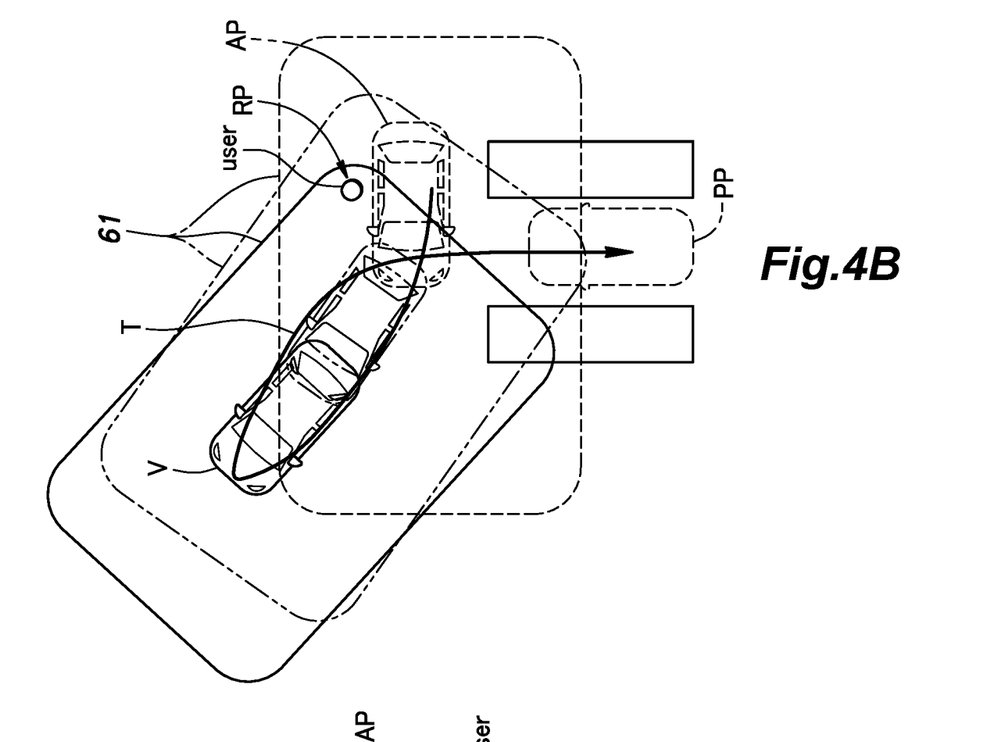
FIG. 4B is a schematic plan view showing the trajectory (traveling route) of the vehicle computed by the vehicle control system and the position of the user in a case where the user is in a side opposite to the parking position with respect to the vehicle according to the embodiment of the present invention.

In the following, the autonomous parking processing by the remote operation is described in a situation where the user holding the operation terminal 3 performs the remote operation without moving. The action plan unit 43 computes a trajectory T (traveling route) to park the vehicle V such that a distance between the vehicle V and the user does not exceed a prescribed value (for example, 6 m). In FIGS. 4 and 7, an imaginary frame 61 surrounding the vehicle V indicates the position 6m away from the vehicle V (namely, the position away from the vehicle V by the prescribed value), and the user holding the operation terminal 3 needs to stay in the frame 61. If the most efficient trajectory T is arbitrarily selected like the related art shown in FIG. 7, the user may deviate from the frame 61 unless the user moves according to the movement of the vehicle V. As shown in FIG. 4A, by changing the traveling direction of the vehicle V several times, the trajectory T for parking the vehicle V can be set such that the user standing at a prescribed position without moving stays in the frame 61. Incidentally, as shown in FIG. 4B, the user may stay in the frame 61 even when the most efficient trajectory T is selected, depending on a standing position of the user.

In the following, the autonomous parking processing by the remote operation is described with reference to FIGS. 1, 4A, 4B, and 5.

Figure 5:
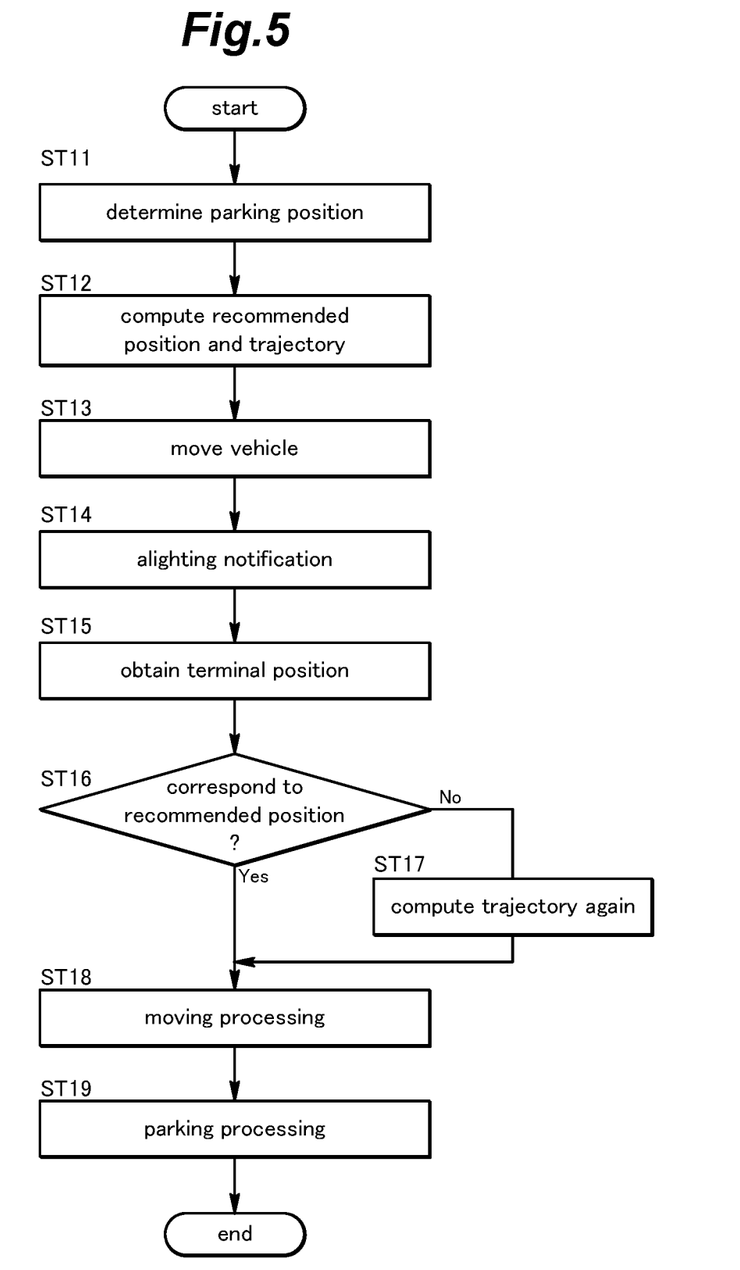
FIG. 5 is a flow chart of autonomous parking processing in the vehicle control system according to the embodiment of the present invention.

When the parking position PP is determined by the user's selection (step ST11, the obtaining processing and the parking position accepting processing in FIG. 3), the action plan unit 43 of the control device 15 computes a recommended position RP, an alighting position AP, a traveling route of the vehicle V from the current position to the alighting position AP, and a trajectory T of the vehicle V that is a traveling route of the vehicle V from the alighting position AP to the parking position PP, based on the information provided from the navigation device 10, the position of the vehicle V identified by the vehicle position identifying unit 42, and/or the parking position PP (step ST12, the trajectory computation processing in FIG. 3). The recommended position RP is a position suitable for the user to perform the autonomous parking processing by the remote operation by using the operation terminal 3 outside the vehicle V without moving. For example, the action plan unit 43 computes the recommended position RP based on the parking position PP such that the recommended position RP is located at a prescribed angle with respect to the parking position PP and is located at a prescribed distance from the parking position PP. The alighting position AP is a position where the user (occupant) alights from or will alight from the vehicle V. The alighting position AP is set close to the recommended position RP. For example, the action plan unit 43 sets the alighting position AP such that the alighting position AP is closer to the recommended position RP than the parking position PP. The action plan unit 43 computes the trajectory T of the vehicle V such that a prescribed condition is satisfied. The prescribed condition is a condition that a distance from a reference position to the vehicle V moving along the trajectory T does not exceed the prescribed value. The reference position is a position where the user is deemed to hold the operation terminal 3 outside the vehicle V without moving, and is set to the recommended position RP in step ST12. That is, in step ST12, the action plan unit 43 computes the trajectory T of the vehicle V such that the distance from the recommended position RP to the vehicle V moving along the trajectory T does not exceed the prescribed value. For example, the action plan unit 43 changes the traveling direction of the vehicle V when the distance from the recommended position RP to the vehicle V nearly reaches the prescribed value so that the distance from the recommended position RP to the vehicle V is kept within the prescribed value. By setting the alighting position AP close to the recommended position RP, the user having alighted from the vehicle V can easily move from the alighting position AP to the recommended position RP. Thereby, it is possible to shorten a period from a timing when the user alights from the vehicle V to a timing when the vehicle V is parked at the parking position PP.

Figure 6:
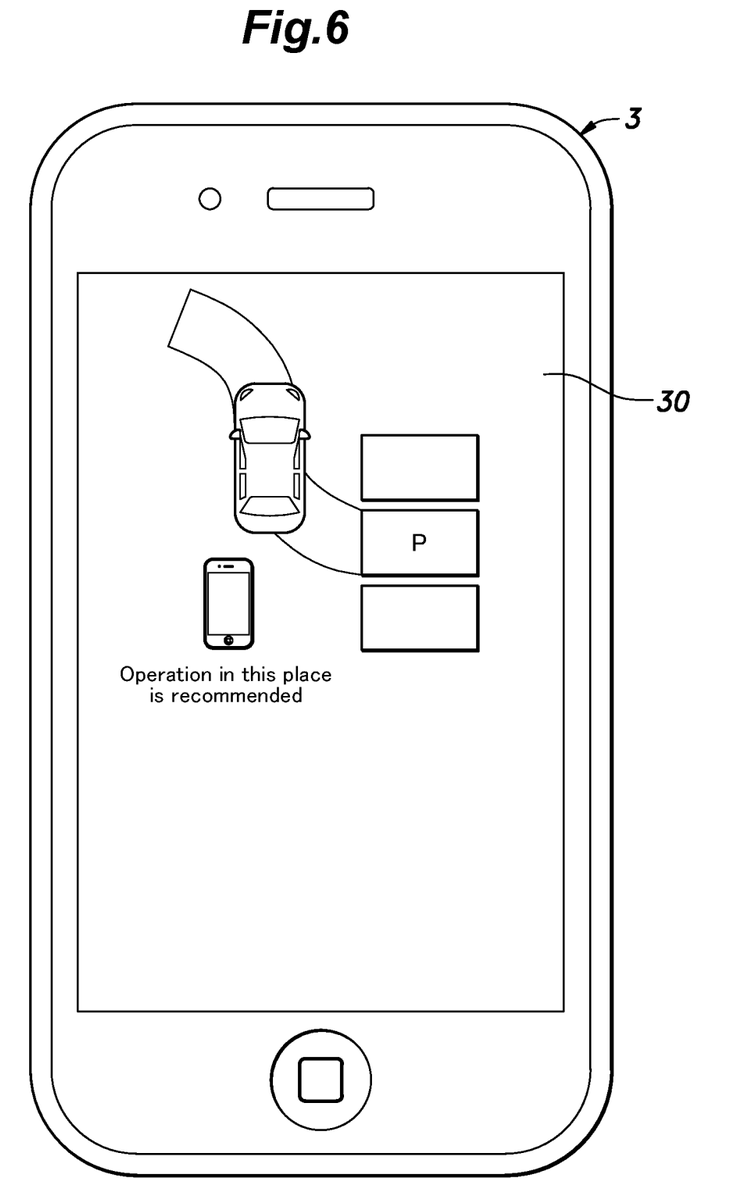
FIG. 6 is an explanatory diagram showing a screen displayed on an operation terminal in the vehicle control system according to the embodiment of the present invention.

The traveling control unit 44 of the control device 15 moves the vehicle V from the current position to the alighting position AP along the traveling route (step ST13). When the vehicle V arrives at the alighting position AP, the control device 15 notifies the user (occupant) that the user should alight from the vehicle V via the human machine interface 13 (HMI 13) provided in the vehicle V (for example, the touch panel 23 or the sound generating device 24) or the input/output unit 30 of the operation terminal 3 (step ST14). At this time, the control device 15 makes the input/output unit 30 of the operation terminal 3 display the parking position PP, the recommended position RP, and the trajectory T to urge the user to move to the recommended position RP (see FIG. 6). Incidentally, if the vehicle V is being driven manually, the control device 15 notifies the user, via the HMI 13 or the input/output unit 30, that the user should stop the vehicle V at the alighting position AP and then alight from the vehicle V. After the user (occupant) alights from the vehicle V, the terminal authentication processing (see FIG. 3) is executed. At the same time, the position detection unit 32 of the operation terminal 3 detects (obtains) a terminal position that is a current position of the operation terminal 3 and sends the terminal position to the control device 15 (step ST15). Since the operation terminal 3 is held by the user, the terminal position can be regarded as a current position of the user.

Next, the action plan unit 43 of the control device 15 determines whether the terminal position corresponds to the recommended position RP (step ST16). The action plan unit 43 of the control device 15 can determine, in a wider area, that the terminal position corresponds to the recommended position RP if the prescribed value is set smaller than an original upper limit of the distance between the user and the vehicle V so that the difference between the terminal position and the recommended position RP can be allowed. Incidentally, these positions are positions in the plane coordinate, which are not related to positions in the height direction. Also, the above distance is a distance in the horizontal direction, which is not related to a distance in the height direction.

When the terminal position does not correspond to the recommended position RP, the action plan unit 43 sets the reference position to the current terminal position and computes the trajectory T again (step ST17).

When the terminal position corresponds to the recommended position RP in step ST16, or when the trajectory T is computed again in ST17, the action plan unit 43 executes the moving processing (step ST18, the moving processing in FIG. 3) and the parking processing (step ST19, the parking processing in FIG. 3). Incidentally, during the moving processing, the action plan unit 43 may notify the user, via the input/output unit 30 of the operation terminal 3, that the user should not move from a current position.

Incidentally, when the action plan unit 43 determines, based on the terminal position, that the user holding the operation terminal 3 has moved from the reference position at a certain timing while the vehicle V is traveling in the autonomous parking processing (step ST18), the action plan unit 43 sets the reference position to the terminal position at the certain timing and computes the trajectory T again such that the above prescribed condition about the distance between the vehicle V and the user is satisfied (a step corresponding to step ST17).

Also, there may be a case where the position detection unit 32 of the operation terminal 3 obtains the relative distance between the vehicle V and the operation terminal 3, instead of obtaining the terminal position that is a position of the operation terminal 3 in a coordinate. In such a case, when the action plan unit 43 estimates that the relative distance will exceed the prescribed value if the vehicle V moves along the trajectory T, instead of executing steps ST16 and ST17, the action plan unit 43 estimates the current position of the user, sets the reference position to the estimated current position, and computes the trajectory T such that the above prescribed condition is satisfied. Namely, the action plan unit 43 estimates the reference position and computes the trajectory T based on the reference position such that the relative distance does not exceed the prescribed value. At this time, the action plan unit 43 estimates the reference position based on a change in the relative distance. By repeating the estimation of the current position of the user and the computation of the trajectory T by trial and error, it is possible to direct the vehicle V to the parking position PP such that the distance between the user and the vehicle V does not exceed the prescribed value. As described above, the method of computing the trajectory T can be applied to a case where the user moves during the moving processing.

As described above, the action plan unit 43 computes the trajectory T such that the distance between the vehicle V and the user does not exceed the prescribed value, and computes the trajectory T again if necessary. Accordingly, even when the user does not move, the autonomous parking processing can be executed such that the distance between the vehicle V and the user does not exceed the prescribed value. Therefore, the user does not need to pay attention to his or her own movement, and can concentrate on monitoring the vehicle V and operating the operation terminal 3 during the autonomous parking processing. Therefore, the autonomous parking processing can be executed safely.

Concrete embodiments of the present invention have been described in the foregoing, but the present invention should not be limited by the foregoing embodiments and various modifications and alterations are possible within the scope of the present invention. In other embodiments, the computation of the trajectory T based on the recommended position RP may be omitted, and the trajectory T computed based on the terminal position after the user (occupant) alights from the vehicle V may be the trajectory that is computed first. The user holding the operation terminal 3 and performs the remote operation of the vehicle V from outside the vehicle V may be a driver, an occupant other than the driver, or a person other than the occupant.

The invention claimed is:
1. A vehicle control system, comprising:
a terminal including an input/output unit and configured to be carried by a user; and
a control device configured to perform wireless communication with the terminal and to execute autonomous parking processing to move a vehicle to a parking position and to park the vehicle at the parking position,
wherein the control device includes
a vehicle position identifying unit configured to detect a position of the vehicle, and an action plan unit configured to set a reference position where the user is deemed to hold the terminal outside the vehicle without moving and to compute a traveling route of the vehicle from an alighting position where the user alights from the vehicle to the parking position such that a condition that a distance from the reference position to a position of the vehicle as the vehicle moves along the traveling route does not exceed a prescribed value is satisfied.

2. The vehicle control system according to claim 1, wherein the action plan unit is configured to compute a recommended position suitable for the user to perform a remote operation of the vehicle by using the terminal outside the vehicle without moving, to set the reference position to the recommended position, and to compute the traveling route such that the condition is satisfied, and the input/output unit is configured to display the recommended position and the traveling route.

3. The vehicle control system according to claim 2, wherein the action plan unit is configured to set the alighting position such that the alighting position is closer to the recommended position than the parking position and to stop the vehicle in which the user rides at the alighting position.

4. The vehicle control system according to claim 2, wherein the terminal includes a position detection unit configured to detect a terminal position that is a position of the terminal, and when the action plan unit determines that the terminal position received from the terminal does not correspond to the recommended position after the action plan unit computes the traveling route, the action plan unit sets the reference position to the terminal position and computes the traveling route again such that the condition is satisfied.

5. The vehicle control system according to claim 4, wherein when the action plan unit determines, at a certain timing while the vehicle is traveling, that the terminal moves from the reference position based on the terminal position, the action plan unit sets the reference position to the terminal position at the certain timing and computes the traveling route again such that the condition is satisfied.

6. The vehicle control system according to claim 1, wherein the terminal includes a position detection unit configured to obtain a relative distance from the position of the vehicle as the vehicle moves along the traveling route to the terminal, and when the action plan unit receives the relative distance from the terminal and estimates that the relative distance will exceed the prescribed value if the vehicle travels along the traveling route, the action plan unit estimates a current position of the user based on a change in the relative distance, sets the reference position to the estimated current position, and computes the traveling route such that the condition is satisfied.

7. The vehicle control system according to claim 1, wherein the terminal includes a position detection unit configured to detect a terminal position that is a position of the terminal, and the action plan unit sets the reference position to the terminal position and computes the traveling route such that the condition is satisfied.

* * * * *